Oct. 17, 1950 J. THEMASCUS, SR 2,526,437
TOASTER
Filed Sept. 12, 1946
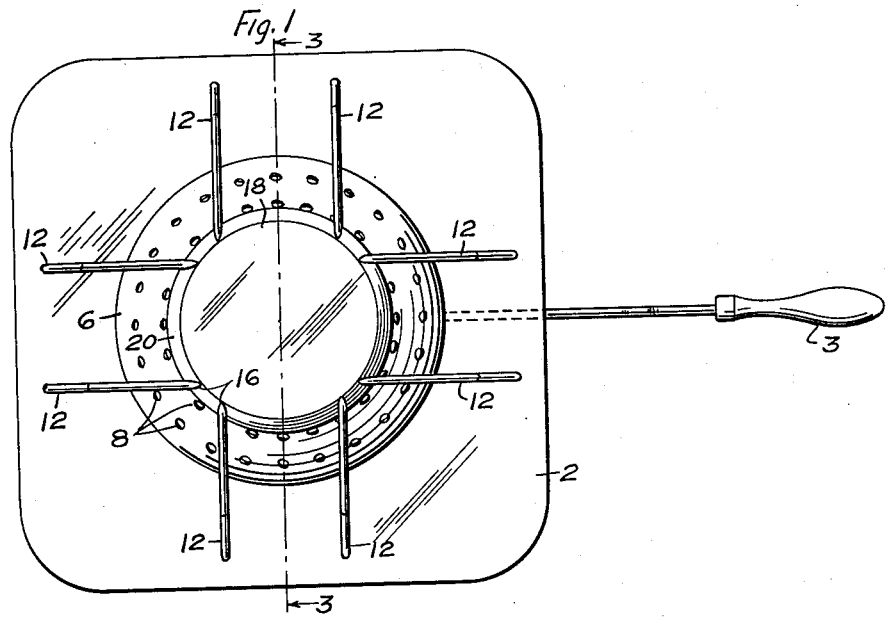
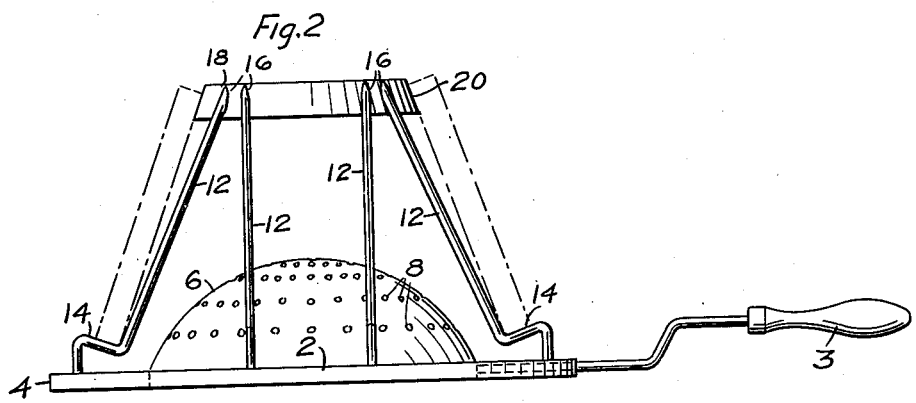
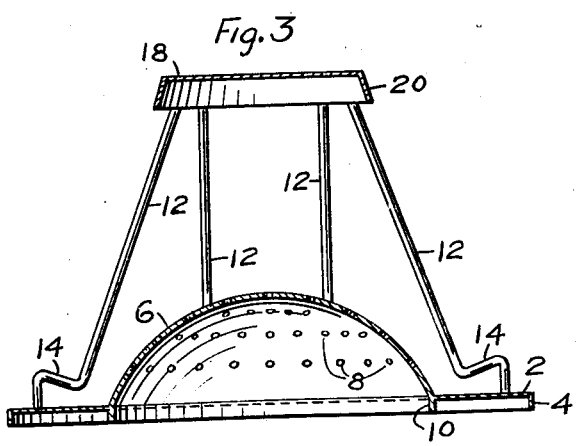
INVENTOR.
JOHN THEMASCUS, SR.
BY Victor J. Evans & Co.
ATTORNEYS Patented Oct. 17, 1950

2,526,437

UNITED STATES PATENT OFFICE 2,526,437

TOASTER

John Themascus, Sr., Chicago, Ill.

Application September 12, 1946, Serial No. 696,431

1 Claim. (Cl. 99—401)

My present invention relates to an improved toaster and more especially to the type of toaster adapted for use over a heat source such as a gas burner on the conventional cooking stove.

The toaster of my invention is adapted to toast four slices of bread simultaneously and to afford even toasting to all of the slices and all of the inner surfaces of the slices which result in the pleasing uniformly brown appearance and the added flavor which is provided when bread slices are so toasted.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 1 is a top plan view of a toaster made according to my invention.

Figure 2 is a side elevational view thereof; and

Figure 3 is a vertical sectional view of the toaster.

Referring now to the drawings wherein like characters indicate like parts, I have illustrated the toaster of my invention comprising a base 2 having a handle 3, and formed with a depending annular flange 4.

This base which is preferably made of metal not subject to warping or otherwise affected by heat is open in the center and over this central opening I have placed a dome 6 also of metal and perforated as at 8. The dome is substantially hemi-spherical in shape and is designed to uniformly deflect the heat waves from the flame or other heat source both by convection from the solid portion of the dome and also from the perforations.

A fire rail or ring 10 is positioned on the lower edge of the dome and is secured to the base about the periphery of the inner or central opening and this rail or ring confines the flame over which the base and dome is positioned into the dome.

At diametrically opposed positions about the base I have utilized wire supports as 12 formed with offset shoulders 14 and the upper extremities of these wire supports are secured as at 16 to the closed cap or deflector 18 which is provided with a depending angular flange 20.

In use the toaster of my invention is placed over a heat source such as a gas flame and four slices of bread are placed on the toaster one slice on each pair of wire supports, the edge of the bread slice being supported by the offset shoulders.

With the gas lighted, the flame will be confined to the area of the dome and the heat will penetrate to the inner surfaces of the bread slices. The heat rising naturally within the toaster will contact the cover and being prevented from rising further will expand outwardly and will thus be directed downwardly by the angularly disposed flange so that the maximum amount of heat will be confined within the toaster to properly and evenly toast the bread slices.

Having thus fully described my invention, what I claim as new and desire to secure by Letters Patent is:

In a gas burner toaster, the combination which comprises a substantially rectangular shaped base having a depending peripheral flange and having a perforated dome-shaped centrally positioned section also having a depending flange providing a fire rail around the periphery thereof, a deflector cap also having a peripheral depending flange aligned with and spaced above the dome-shaped section of the base, and four pairs of parallel wire supports mounted on the base, extended upwardly and sloping inwardly to support the said deflector cap, each pair of said wire supports having Z-shaped sections in the lower end and spaced from the base and providing rests for slices of bread.

JOHN THEMASCUS, SR.

REFERENCES CITED

The following references are of record in the file of this patent:

UNITED STATES PATENTS

| Number | Name | Date |
|---|---|---|
| 610,668 | Wilson | Sept. 13, 1898 |
| 712,340 | Silver et al. | Oct. 28, 1902 |
| 846,546 | Brock | Mar. 12, 1907 |
| 1,202,059 | Greener | Oct. 24, 1916 |
| 1,321,318 | Lefrancois | Nov. 11, 1919 |

FOREIGN PATENTS

| Number | Country | Date |
|---|---|---|
| 10,455 | Great Britain | 1911 |